Feb. 12, 1935.　　　H. S. JOHNSON ET AL　　　1,990,734
MEAT COOKER
Filed March 29, 1934　　　2 Sheets-Sheet 1

INVENTORS
Harvey S. Johnson
Arnold C. Schroeder
BY Martin & Rendell
ATTORNEYS

Feb. 12, 1935.   H. S. JOHNSON ET AL   1,990,734
MEAT COOKER
Filed March 29, 1934   2 Sheets-Sheet 2
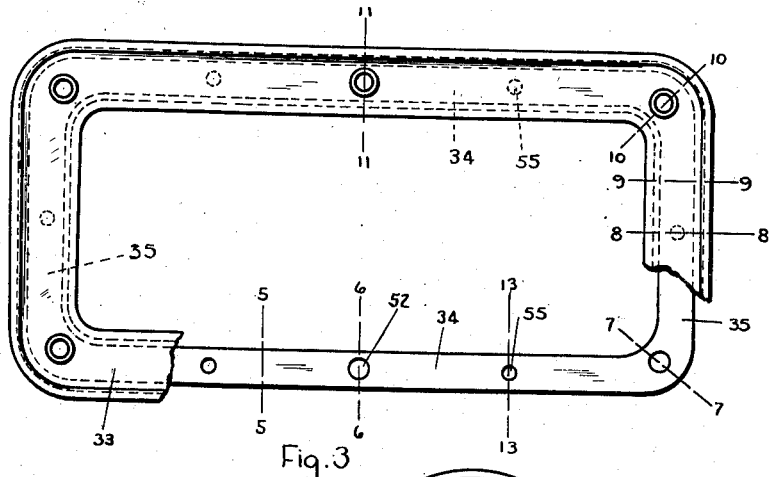
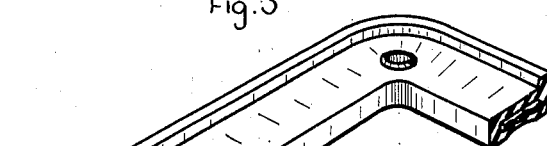
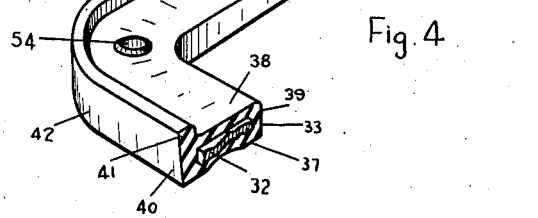
INVENTORS
Harvey S. Johnson
Arnold C. Schroeder
BY Martin & Rendell
ATTORNEYS Patented Feb. 12, 1935

1,990,734

UNITED STATES PATENT OFFICE 1,990,734

MEAT COOKER

Harvey S. Johnson and Arnold C. Schroeder, Utica, N. Y., assignors to The Bossert Corporation, Utica, N. Y., a corporation of New York Application March 29, 1934, Serial No. 718,001

2 Claims. (Cl. 100—57)

Our present invention relates to a meat cooker or boiler commonly called a ham boiler and especially to the gasket constructed to be used therewith.

The purposes of our present invention are to provide a meat or ham cooker or boiler of new, improved and more effective and hygienic construction and particularly to provide a new and improved gasket construction especially adapted to be used between the pressure plate of the ham cooker and the receptacle of the cooker hereinafter called the cooker or boiler.

Heretofore it has been common to insert a somewhat elastic and resilient gasket of rubber or the like in a channel extending about the edge of the pressure plate with said gasket designed to effect a sliding tight joint against the opposite parallel inner walls of the receptacle of the boiler. That construction, however, is not hygienic and is not satisfactory in that the band of rubber had to fit in its groove or channel loosely enough to allow the band of rubber to be stretched temporarily when being placed into the channel. This elasticity and looseness of the fit resulted in there being openings above and below or to the back of the rubber in the channel sufficient to hold the water and its contained fat and meat juices from one cooking process which would not be eliminated by the ordinary or even thorough washing of the pressure plate unless the said rubber gasket was removed and the gasket and channel separately cleaned. The labor and time for removing the gasket from the plate and the separate cleaning and scrubbing of the re-entering groove adds unduly to the cost of each cooking operation. Furthermore, the repeated stretching of the rubber gasket of that type further impaired its life and fit. The retention of even a small amount of meat juice and fat about such a gasket would allow such material to soon become rancid. This rancidness or sourness would be communicated to the liquid and consequently to the meat subsequently placed in a cooker having the rancid gasket.

The particular purposes of our present invention is to provide a gasket construction of such form as to overcome the disadvantages above named and particularly to provide a meat cooker gasket which is so constructed and so assembled or combined with the pressure plate as to eliminate the use of a peripheral groove or the stretching of a gasket to be placed therein and instead to provide a gasket adapted to be placed flat against the top of the pressure plate in such form as to provide a durable tight joint between the gasket and the pressure plate and between the gasket and the mechanism used to fasten the gasket to the plate and generally to provide a gasket so constructed that it may be readily and effectively cleaned by the cleaning and washing operation used for the plate without the liability of the accumulation of grease or meat juices around the gasket or plate or the fastening means mentioned; and further to have the construction of such a character that the gasket does not ordinarily have to be removed for the cleaning operation, but only for ultimate re-placement of the gasket.

A still further purpose of our invention is to provide a meat cooker gasket of such construction that it may be readily and removably and detachably secured to the flat pressure plate by a few simple fastening means and still hold the gasket tight against the plate and allow the gasket to make a tight sliding joint against the inner walls of the boiler.

Fig. 3 is a top or plan view of the gasket shown in Figs. 1 and 2, but with the rubber or other resilient gasket material removed from a part of the stiff frame of the gasket.

Fig. 4 is a perspective view of part of the gasket as shown in Figs. 3.

Figs. 5 to 11 both inclusive are detail sectional views respectively on lines 5—5, 6—6, 7—7, 8—8, 9—9, 10—10 and 11—11 of Fig. 3.

Figure 1:
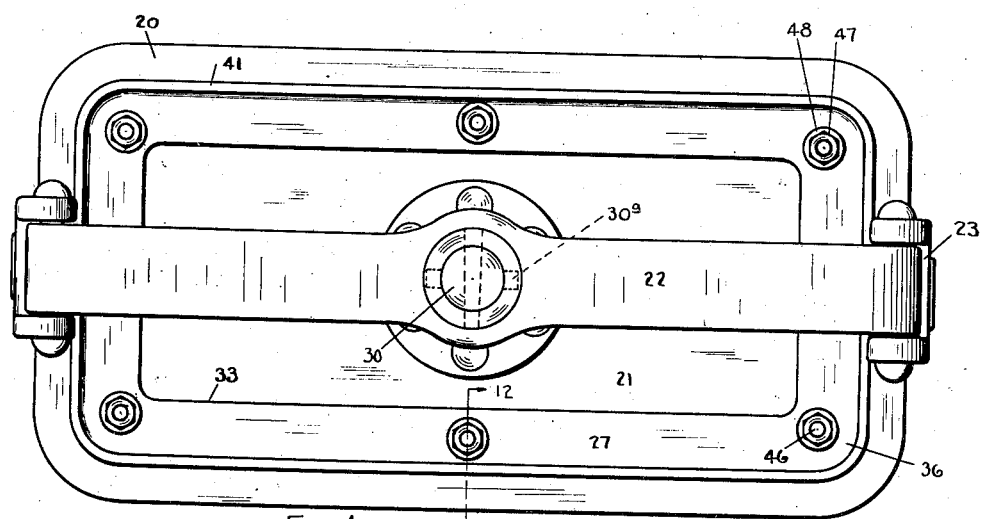
Fig. 1 is a top or plan view and Fig. 2 is a view partly in side elevation and partly in longitudinal vertical section of a meat cooker equipped with a construction embodying our invention.

Fig. 12 is a detail sectional view on line 12—12 of Fig. 1.

Fig. 13 is a sectional view on line 13—13 of Fig. 3.

Figure 2:
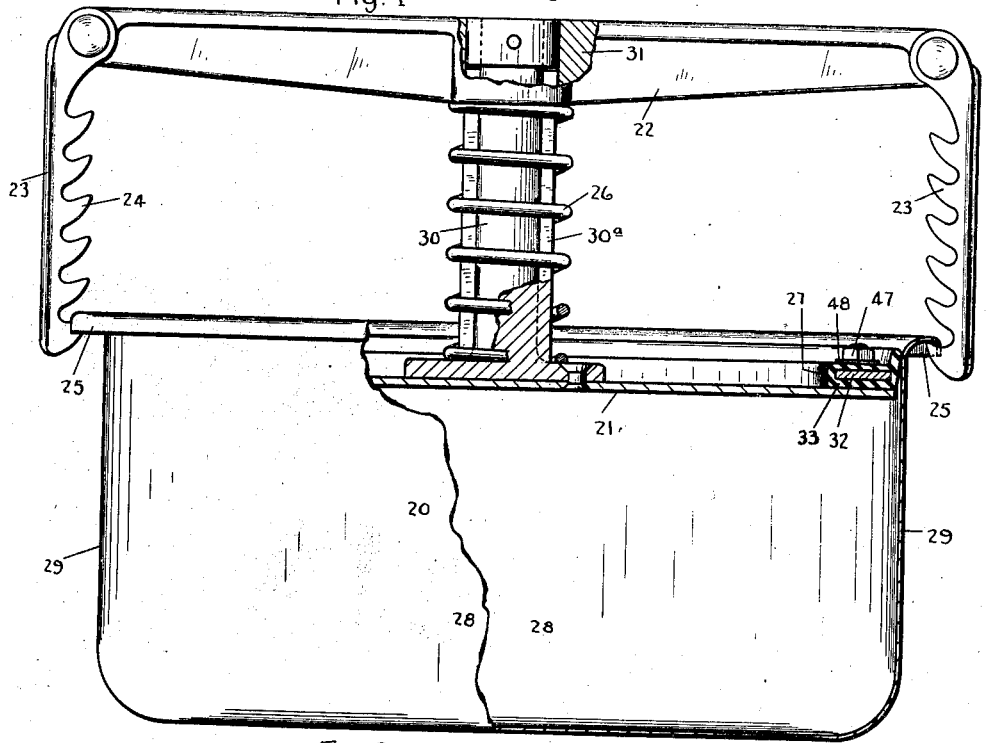

Referring to the drawings in a more particular description and first more especially to Figs. 1 and 2, it will be seen that the meat cooking device (often called simply a ham cooker because hams are usually cooked therein) consists of a cooking receptacle or cooker 20, a horizontally disposed pressure plate 21 slidingly fitting therein, a superposed bridge member 22 having arms 23 swingingly mounted at its ends and provided with hooks 24 adapted to engage the outwardly and downturned bead 25 provided upon the upper outer edge of the receptacle 20 and a coiled spring 26 interposed between the said bridge 22 and the pressure plate 21 and maintained in position with suitable guide members and a gasket 27 secured as a unit to the top of the pressure plate adjacent its edge.

The receptacle or cooker 20 may be of any desired shape, but is here illustrated in the form of a rectangular vessel with rounded corners, its opposite side walls as 28—28 and 29—29 respectively parallel. The side walls are preferably vertical or approximately vertical so that the gasket-equipped pressure plate 21 may have a sliding but tight fit at any working plane in the height of the receptacle.

About at the center of the plate there is provided and securely fastened to its upper side an upwardly extending post 30 having outwardly extending keys 30ª, the post being adapted to slide within a hub 31 extending downward from the middle of the bridge 22 with notches to fit said keys. About said post and its keys is placed a relatively strong expansion coiled spring 26 having its opposite ends engaging respectively the lower part of the bridge and the enlarged base of the post or the adjacent surface of the said plate. The action of the coiled spring 26 is to tend to force the pressure plate 21 downwardly from the bridge 22. The operation of the swinging arms 23 by means of their inwardly extending and upturned hooks 24 is to allow the bridge and to a certain extent the plate 21 to be adjusted downwardly as far as necessary by having hooks above the bottom pair engage the bead 25 according to the size of the ham or other joint of meat placed in the receptacle 20.

The construction so far described except the gasket 27 is old art and not original with us and so does not need more detailed description.

The gasket 27 consists of an open flat stiff frame 32 and a casing 33 of rubber or rubber-like material, that is having the necessary amount of resiliency and elasticity found in rubber and adapted to be molded in the proper shape effectively about the stiff frame 32 and having the water and liquid-proof qualities of rubber or rubber composition and adapted to resist the chemical conditions present in a ham cooker.

The open frame 32 is formed of some suitably stiff, relatively hard durable material such as a proper metal as iron. The frame 32 is open, that is in the form of a flat band or ring transversely of the proper thickness and width and having a shape and an exterior size approximating, but in practice very slightly less than, the periphery of the plate 21. In the boiler here shown the receptacle 20 and accordingly the plate 21 are elongated rectangles having, however, rounded corners 36. Accordingly the gasket as a whole and the stiff frame 32 therefor is of a corresponding shape having two of the opposite sides 34—34 and two opposite short sides 35—35 connected at the corners by rounding parts as appears particularly in Fig. 3.

The rubber or similar rubber-like gasket material forming the casing 33 is applied closely about all the surfaces of the open frame 32 in a layer of the desired thickness so as to form a bottom 37, a top 38 and inner side 39 and an outer side 40. The placing of this material about the stiff frame 32 is in practice accomplished by a molding process which places the proper amount of said gasket-forming material about all the surfaces of said frame so as to entirely enclose the said frame. The active or receptacle-engaging edge of the gasket is the outer side 40 of this casing and accordingly this outer side is preferably formed on or with a slant extending slightly outwardly as it extends upwardly so as to make the required easy sliding fit when the plate with the gasket secured thereon is placed in a receptacle and forced down therein. Preferably also as appears particularly from several views in the drawings this outer side 40 is extended upwardly above the level of the top 38 of the casing so as to form the upwardly extending flange 41 which has its outer edge in line with the already-mentioned outer edge of the main outer side 40 with the outer parts of said flange and outer side forming one continuous slanting face 42.

Preferably the bottom face of the casing, that is the lower face of the bottom 37, is not flat for its full width but has adjacent its opposite extremes relatively narrow flat and aligned faces 43 and 44 connected by an intervening upwardly extending concave portion 45. The purpose of this detail is to insure that when the gasket as a whole is pressed tightly against the top of the plate the outer parts, namely the faces 43 and 44 will fit very tightly and with durable tight joints against the top of the plate.

The gasket 27 as a unit is adapted to be readily attached to or removed from the plate 21. The preferred form of such attachment is to have studs 46 provided at spaced points upon the plate 21 and extending up the proper distance so that their screw-threaded upper ends may be engaged by a nut 47 with an intervening stiff washer 48 placed below the said nut and engaging the top surface of the casing of the gasket. Preferably these studs are permanently attached to the said plate and in any event if going through the plate, have such connection with the plate as to form a permanently tight joint between the head of the stud and the engaged portion of the plate so that there shall be no possibility of grease or meat juices leaking through said joint or accumulating therein. A preferred form of such construction is that shown in the drawings in that the neck 49 of the stud provides an outwardly extending shoulder 50 between the said neck and the main unthreaded shank 51 of the stud, which shoulder bears against the upper surface of the plate. The head of the stud is then turned or riveted over into a countersunk hole provided in the lower side of the plate, effecting a rigid, permanent and very tight joint.

To admit of these fastening studs passing through the gasket there is provided a series of spaced holes 52 in the gasket frame 32. These holes are of sufficient number and spaced about the frame so as to insure the holding of the gasket securely against the top of the plate. In the gasket shown in Figs. 1 and 3 there are six of these holes 52, one at each of the corners of the plate and one in about the middle of the length of the long sides 34. The holes 52 are appreciably larger than the upstanding portion of the stud 46 so that in the molding or other forming of the gasket casing 33 about the rigid frame a sleeve-like layer 53 of the gasket-forming material will be provided against or opposite the circular inner face of the holes 52 in the frame when the corresponding holes 54 are formed or made in the gasket casing 33 with said holes 54 respectively approximately concentric with the frame holes 52, but considerably smaller. The holes 54 are preferably formed just large enough to readily admit of the insertion or removal of the upstanding portions of the studs 46 without injury to the gasket material about the holes 54.

By reference to Fig. 11 which is a transverse sectional view through the gasket at one of the frame holes 52 and casing holes 54 in the middle of the long side of the gasket, it will be seen that the hole 52 is approximately in the middle of the width of the frame 32 (see also Fig. 6). In practice, however, the holes 54 and accordingly the holes 52 provided at the four corners of the gasket are set inwardly a little farther on account of their being located at the corners and in order to provide room for the washer 48 and also to provide working room for a tool to be applied to the nut 47 in affixing or removing the gasket. This inward location of these holes 52 at the corners of the frame appears in Figs. 7 and 10.

Having the sleeve-like layers 53 opposite the metal of the frame holes 52 is for two purposes. The first is to make sure that no liquid, grease or meat juices can gain access to the metal frame either during normal use of the cooker or during the cleaning of the plate and gasket either when together as during normal cleaning or when the gasket is removed from the plate for an occasional separate cleaning that may be made. The second purpose of this sleeve-like layer of rubber or other material is to form at each hole 54 an effective web of the rubber or other gasket material connecting the top 38 and the bottom 37 of the gasket casing intermediate the edges of the gasket and serving to overcome any tendency of the said top and bottom to move away from the flat frame even when the gasket is not on a plate.

This second purpose of holding the top and bottom layers of the casing in place is preferably also effected by providing another series of holes 55 in the frame between its edges and spaced between the other holes 52. When the rubber or other gasket-forming material is formed about the frame, the said rubber or other material is placed or forced into these holes forming small short solid pillars 56 integral at their opposite ends with the top 38 and bottom 37 of the casing and so tying the said top and bottom securely in position.

The casing of rubber or other gasket-forming material is preferably provided as at the time of the molding or other forming of the casing with a short upstanding collar 57 which when the gasket is fastened to the plate is pressed downwardly and inwardly closely against the shank of the stud by the washer 48 under the pressure of the nut 47. This operates still further to tighten the joint between the top of the gasket, the washer 48 and the nut 47 so that there is no possibility of leakage at this point and also no crevice in which grease or meat juices may accumulate.

It will now be seen that we have provided a gasket which is especially well adapted to accomplish the purposes hereinbefore set forth and which can be readily applied as a unit to a ham cooker plate and readily fastened thereagainst so as to leave no re-entering groove or crevices in which grease or meat juices may accumulate or through which water may enter. It will be seen also that the whole construction of fastening this gasket to the plate in general by the means described and illustrated provides a plate and gasket and connecting means which are especially well adapted to remain hygienic and clean with the ordinary washing that is given to the plate after each cooking and without requiring ordinarily the removal of the gasket from the plate.

What we claim as new and desire to secure by Letters Patent is:

1. A gasket for use on, and adjacent the edge of, a pressure plate slidingly mounted in a meat cooker, consisting of an open, flat stiff frame having its exterior size approximately the same as the pressure plate and provided with a plurality of vertically extending holes spaced about the frame intermediate its inner and outer edges and a casing of resilient gasket-material entirely and closely enclosing said frame and having apertures concentric with but smaller than the said spaced holes in the frame and adapted to receive therethrough means for fastening the gasket to the plate, said casing having its outer edges adapted to make a tight sliding fit against the inner side walls of the cooker.

2. A gasket for use on, and adjacent the edge of, a pressure plate slidingly mounted in a meat cooker, consisting of an open, flat stiff frame having its exterior size approximately the same as the pressure plate and a casing of resilient gasket-material entirely and closely enclosing said frame, said casing having its plate-contacting face concave and an upwardly extending outwardly slanting flange at its outer edges adapted to make a tight sliding fit against the inner side walls of the cooker.

HARVEY S. JOHNSON.
ARNOLD C. SCHROEDER.